United States Patent [19]

Lamos et al.

[11] Patent Number: 4,773,168

[45] Date of Patent: Sep. 27, 1988

[54] THERMAL DRYER FOR RESIN PROCESSING

[75] Inventors: Emil M. Lamos, Farmington Hills; Thomas C. Ross, Livonia, both of Mich.

[73] Assignee: AEC, Inc., Wood Dale, Ill.

[21] Appl. No.: 945,825

[22] Filed: Dec. 24, 1986

[51] Int. Cl.⁴ .............................................. F26B 17/12
[52] U.S. Cl. ........................................ 34/48; 34/168; 34/174
[58] Field of Search ................ 34/168, 56, 48, 12, 34/60, 169, 174

[56] References Cited

U.S. PATENT DOCUMENTS

| | | |
|---|---|---|
| 2,180,968 | 11/1939 | Schorn et al. . |
| 2,740,204 | 4/1956 | Seltzer et al. ........................ 34/174 |
| 3,175,302 | 3/1965 | Retali et al. . |
| 3,335,461 | 8/1967 | Schwartz . |
| 3,798,786 | 3/1977 | Graber . |
| 3,875,683 | 4/1975 | Waters . |
| 4,043,050 | 8/1977 | Hancock . |
| 4,168,942 | 9/1979 | Firth . |
| 4,258,476 | 3/1981 | Caughey . |
| 4,294,020 | 10/1981 | Evans . |
| 4,337,584 | 7/1982 | Johnson . |
| 4,353,851 | 10/1982 | Godfrey et al. . |
| 4,446,094 | 5/1984 | Rossiter . |
| 4,531,308 | 7/1985 | Nielson et al. . |

Primary Examiner—Larry I. Schwartz
Attorney, Agent, or Firm—Kinzer, Plyer, Dorn, McEachran & Jambor

[57] ABSTRACT

A thermal dryer for drying granular resin immediately prior to its introduction into a molding machine or other resin processing apparatus comprises a vertically oriented cylindrical drying chamber with means to introduce granular resin at its top, the resin flowing down through the chamber and out into the processing apparatus; a rectangular tubular member defines an air passage around the drying chamber, with communication from the top of the drying chamber to the air passage. An enclosed electrical heater and a blower are mounted in a housing encompassing the tubular member and the drying chamber; the blower pulls air through an inlet port into the housing to pass over the blower and its motor, into the heater enclosure and out through an air discharge tube into the bottom part of the drying chamber, out the top of the drying chamber into the air passage, and then through the blower to an outlet port. The drying chamber and air passage are extended into the resin processing apparatus so that gases from that apparatus are drawn directly into the air passage, to be exhausted through the blower.

19 Claims, 3 Drawing Sheets

THERMAL DRYER FOR RESIN PROCESSING

BACKGROUND OF THE INVENTION

In most resin processing apparatus, particularly injection molding and extruding machines, moisture absorbed by or otherwise entrained in the granular or pelletized resins supplied to the processing apparatus presents substantial difficulties. Many resin materials are hygroscopic, or at least may include appreciable quantities of entrained moisture. For high quality molded plastics or extrusions, however, a low moisture content is usually required. For example, some resinous materials may normally have a water content of over 0.2% whereas the processing apparatus may require resin with a water content of 0.08% or less to produce a quality product.

A thermal dryer for reducing the moisture content of such granular resins is disclosed in Waters U.S. Pat. No. 3,875,683. In that dryer the granular resin passes downwardly through a plenum chamber in which it is contacted with a drying gas, usually air. The drying air is heated to a predetermined temperature immediately prior to contact with the granular resin. This type of thermal dryer, while performing well in most respects, is rather inefficient in regard to heat loss characteristics, and temperature control over the drying air may be difficult to maintain.

Another thermal drying apparatus, employed to dry granular resin immediately prior to its introduction into an extruder or injection molding machine, is described in Nielson et al U.S. Pat. No. 4,531,308. The Nielson et al apparatus is generally similar to that described in the Waters patent but is usually somewhat smaller in size and is mounted directly on an extruder, injection molding machine, or other resin processing apparatus. This form of thermal dryer also is rather inefficient in its utilization of the energy required to heat the drying air. Precision control of the temperature of the drying air, as applied to the granular resin, can be difficult to realize. Further, the dryer tends to interfere with some operations of the resin processing apparatus, particularly on a changeover from one product to another.

SUMMARY OF THE INVENTION

Accordingly, it is an object of the present invention to provide a new and improved thermal dryer for drying pelletized or granular resin, particularly a thermal dryer of rather limited size readily adapted to be mounted directly on a resin processing apparatus such as an extruder or injection molding machine, that effectively minimizes or eliminates the disadvantages of previously known drying equipment, particularly the thermal dryers referred to above.

A further object of the invention is to provide a new and improved thermal dryer, for drying granular or pelletized resin, that utilizes heat generated by a blower or other air circulating equipment constituting a part of the thermal dryer, yet maintains relatively precise control of the temperature of the drying air applied to the resin.

Another object of the invention is to provide a small, simple, economical thermal dryer for drying granular resin, a dryer that affords an extended operating life substantially free of maintenance difficulties and that permits effective servicing of the dryer and of resin processing apparatus on which the dryer is mounted.

Accordingly, the invention relates to a thermal dryer for drying granular or pelletized resin comprising a vertically oriented cylinder defining a resin drying chamber, the bottom of the cylinder having a discharge opening for discharging resin from the drying chamber, with resin input means for introducing granular resin into the top of the cylinder to flow downwardly through the drying chamber. A tubular member is disposed in spaced encompassing relation to at least a top portion of the cylinder, the cylinder and the tubular member defining an air passage in communication with the drying chamber, and a housing is disposed in spaced encompassing relation to the tubular member and the cylinder, defining an enclosed air treatment chamber having an air inlet port and an air outlet port, that is isolated from the drying chamber and the air passage. Heater means, comprising a heater disposed within a heater enclosure mounted in the air treatment chamber, is provided for heating air passing through the heater enclosure, the heater enclosure having at least one air entry opening to admit air from into the air treatment chamber; a process air tube extends from the heater enclosure into the lower portion of the drying chamber. Air blower means is mounted in the air treatment chamber, with its inlet connected to the air passage and its outlet connected to the outlet port; the blower means establishes and maintains a flow of air from the inlet port into the air treatment chamber, around the blower means, into and through the heater means and the process air tube, upwardly through the resin in the drying chamber and into the air passage, through the blower means, and out through the outlet port.

DETAILED DESCRIPTION OF THE PREFERRED EMBODIMENT

Figure 1:
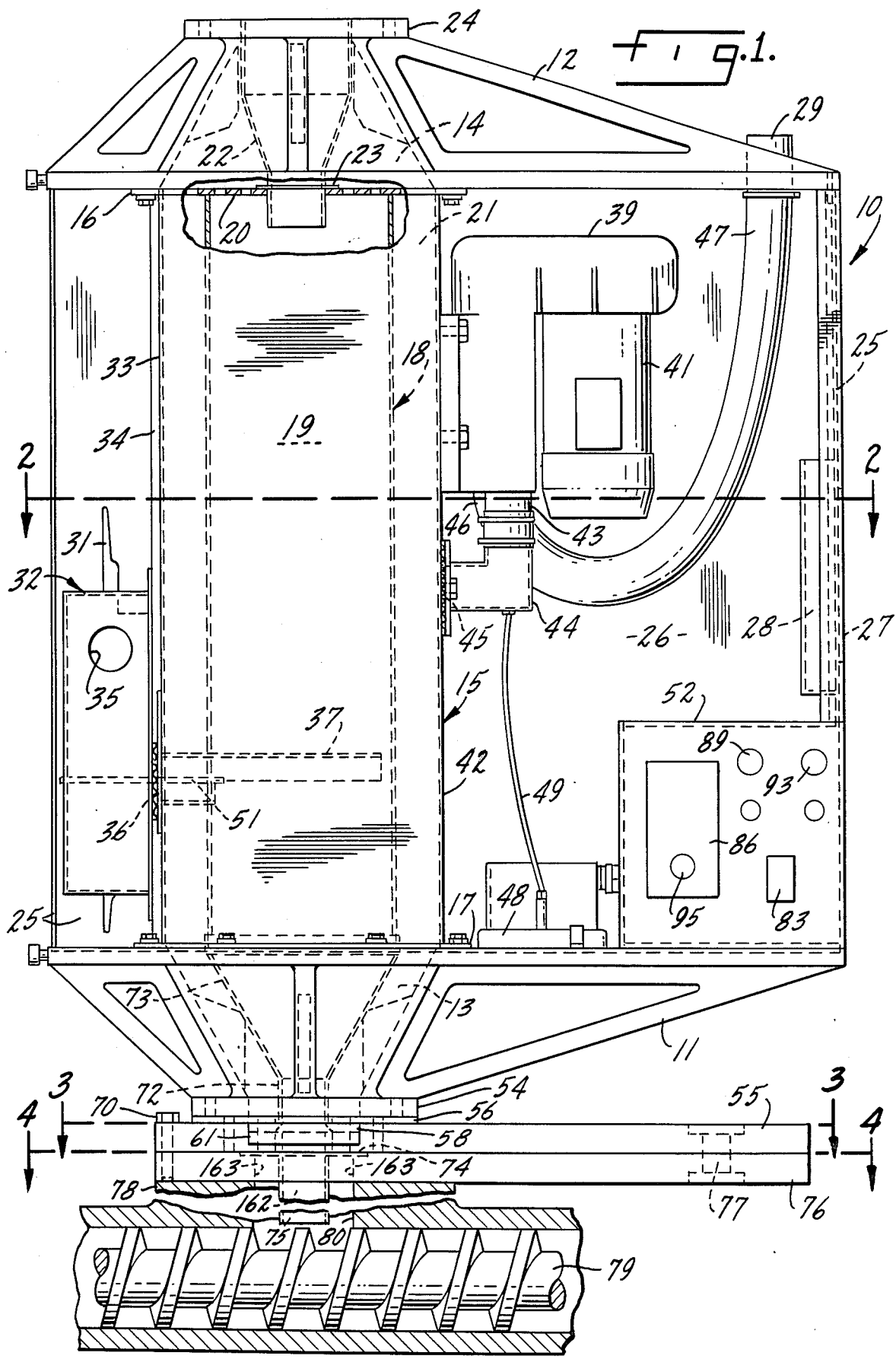
FIG. 1 is a side elevation view of a thermal dryer constructed in accordance with one embodiment of the invention, with a side panel removed.
Figure 2:
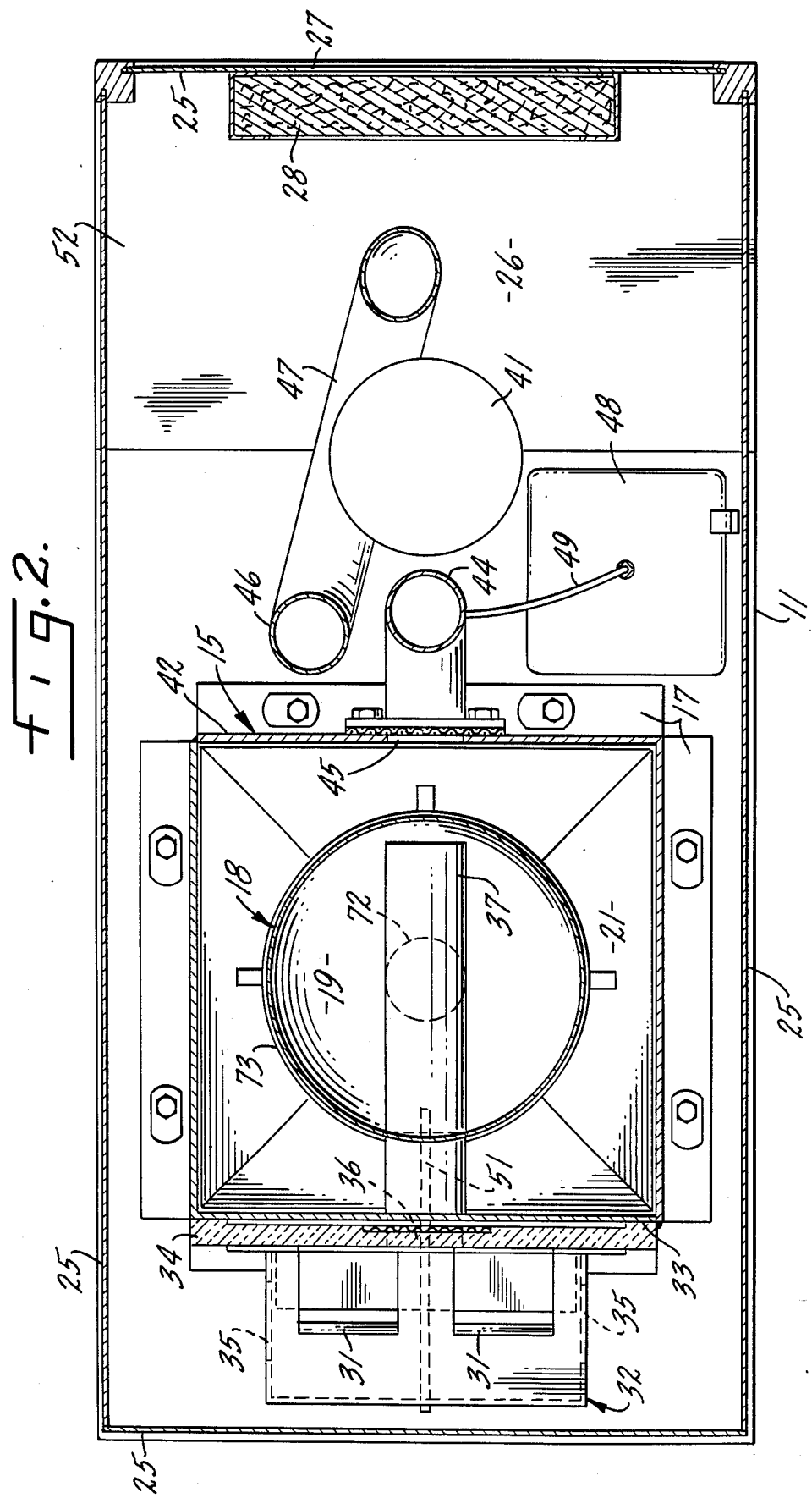
FIG. 2 is a section view taken approximately along line 2—2 in FIG. 1.
Figure 3:
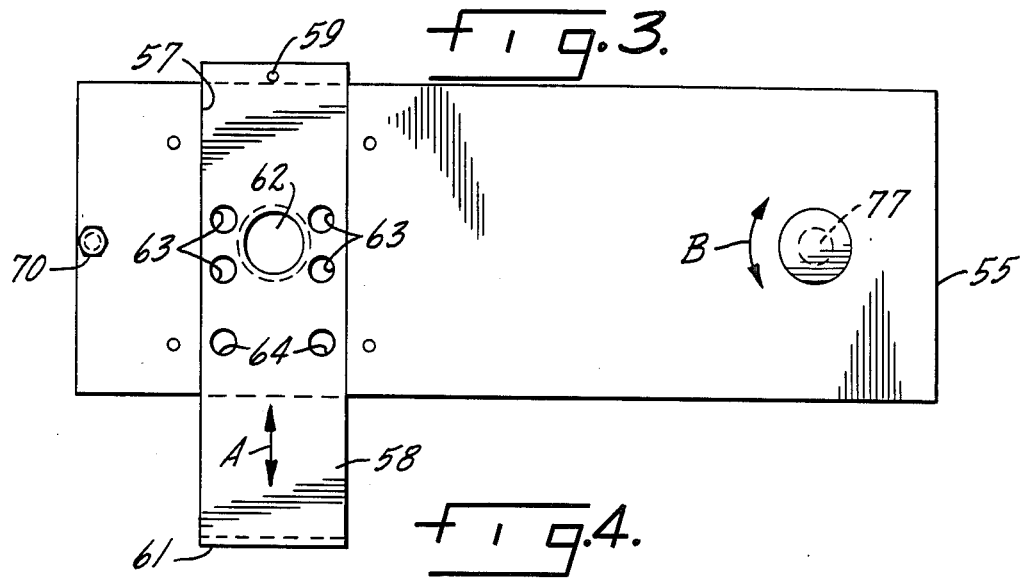
FIGS. 3 and 4 are section views taken approximately along lines 3—3 and 4—4 in FIG. 1.

FIGS. 1-3 illustrate a thermal dryer 10 constructed in accordance with a preferred embodiment of the present invention. As shown in FIG. 1, dryer 10 includes two cast aluminum end bells 11 and 12. End bells 11 and 12 may be identical; each has a relatively large central passage of frusto-conical configuration, the central passages in end bells 11 and 12 being identified by reference numerals 13 and 14 respectively.

A square tubular support member 15 having upper and lower flanges 16 and 17 is mounted between and connects end bells 11 and 12; member 15 constitutes the principal support for end bell 12. A vertically oriented cylinder 18 is mounted within support member 15, extending for the full height of the support member; cylinder 18 defines a central resin drying chamber 19. cylinder 18 is supported on a funnel 73, which in turn is supported by end bell 11. The space surrounding cylinder 18, between the cylinder and member 15, constitutes an air passage 21. A perforated plate 20 is disposed on top of cylinder 18.

Dryer 10, FIG. 1, further includes resin input means for introducing granular or pelletized resin into the top of drying chamber 19. This resin input means includes an inlet funnel-shaped tube 22 that is welded to or otherwise affixed to a support ring 23. Support ring 23 serves to mount inlet tube 22 on perforated plate 20, with a portion of inlet tube 22 projecting downwardly into the upper end of drying chamber 19. Tube 22 and flange 23 hold plate 20 in position on cylinder 18. End bell 12 includes a flange 24 on which a conventional vacuum or pneumatic hopper (not shown) may be mounted to feed pelletized or granular resin through tube 22 into drying chamber 19.

A rectangular shroud or housing 25 is disposed in spaced encompassing relation to member 15 and cylinder 18, defining an enclosed air treatment chamber 26 that is isolated from drying chamber 19 and air passage 21. Chamber 26 has an air inlet port 27 covered by an inlet air filter 28. The air treatment chamber also has an outlet port 29 which, in the illustrated embodiment, is a tube that extends upwardly through end bell 12. However, outlet port 29 could also extend through one of the walls of housing 25.

Thermal dryer 10 further comprises a heater means including two electrical heaters 31 mounted within a small sheet metal enclosure 32. The heater enclosure 32 is mounted on one wall 33 of the tubular support member 15. In the preferred construction, a layer 34 of insulation is interposed between the heater means 31,32 and wall 33 of member 15 to limit conductive heat transfer between the heater and the support member. Heater enclosure 32 includes two air inlet openings 35 to admit air from chamber 26 into the heater enclosure. Heater enclosure 32 further comprises an outlet opening 36 covered by a mesh screen 36. A process air tube 37 extends from the outlet opening 36 of heater enclosure 32 through air passage 21 and across the lower portion of drying chamber 19. Virtually the entire length of tube 37 located within drying chamber 19 is open at the bottom of the tube to discharge drying air into chamber 19.

A regenerative air blower 39 driven by a motor 41 is mounted in air treatment chamber 26 on the wall 42 of tubular support member 15 opposite the wall 33 on which heater 31,32 is mounted. Blower 39 has an air inlet 43 connected by an elbow 44 to an outlet opening 45 in tubular member 15 that is covered by a mesh screen, so that the blower inlet 43 is directly connected to air passage 21. The outlet 46 of blower 39 is connected by a high temperature hose 47 to the air outlet port 29 from chamber 26.

A pressure switch 48 is mounted in chamber 26 and is connected by a tube 49 to the elbow 44 leading to blower inlet 43. Pressure switch 48 is a part of the electrical control for thermal dryer 10. Another portion of that electrical control is a thermocouple 51 mounted in process air tube 37; see FIGS. 1 and 2. The remainder of the electrical control is mounted in a small housing 52 in chamber 26, with access provided through an opening in housing 25.

Figure 4:
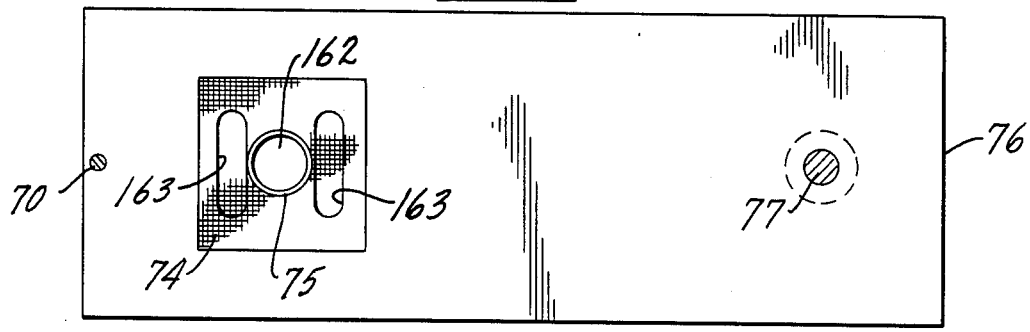

The manner in which thermal dryer 10 is mounted upon an extrusion molding machine or other resin processing apparatus is shown in FIGS. 1, 3 and 4. As seen in FIG. 1, the flange 54 on the bottom bell 11 of dryer 10 is affixed to an upper pivotal mounting plate 55 by means of an adapter plate 56 and appropriate bolts. Mounting plate 55 (FIG. 3) has a transverse slot 57 in which a slide gate 58 is mounted; gate 58 is held in slot 57 by adapter plate 56. A screw 59 is mounted in one end of gate 58 to limit movement of the gate (arrows A); a flange 61 serves the same purpose on the other end of gate 58.

Mounting plate 55 and gate 58 each have a large aperture 62 aligned with the lower end 72 of the funnel 73 at the bottom of cylinder 18 (FIG. 1). Gate 58 and mounting plate 55 also each include four aligned peripheral apertures 63 around aperture 62. These apertures 63 are aligned with the peripheral portion of the lower end of passage 13 in end bell 11. Gate 58 also includes two additional apertures 64 that are aligned with but displaced from apertures 63; there are no openings in mounting plate 55 corresponding to apertures 64.

A lower mounting plate 76, FIGS. 1 and 4, supports the pivotal upper mounting plate 55. A pivot pin 77 interconnects plates 55 and 76 at the right-hand end of the plates as shown in FIGS. 1, 3 and 4. At the other end of the pivotal mounting plates 55 and 76, a locating pin 70 holds the two plates aligned in a normal operating position. The lower mounting plate 76 has a central aperture 162 flanked by two elongated apertures 163. A wire screen 74 covers the two side apertures 163 but is open as regards the central aperture 162. A drop tube 75 is mounted in the central aperture 162 and extends downwardly as shown in FIG. 1. Referring to FIGS. 3 and 4, it will be seen that apertures 62 in plate 55 and gate 58 are aligned with aperture 162 in plate 76 and that the apertures 63 in plate 55 and gate 58 line up with the apertures 163 in plate 76.

The lower mounting plate 76 is affixed to the top of the inlet throat 78 for an extrusion press or other resin processing apparatus, shown as comprising a feed screw 79. No mounting bolts or other such mounting devices have been shown because the configuration of the inlet throat 78 for different resin processing machines varies so widely as to preclude any standard mounting arrangement. For each different machine, therefore, plate 76 is drilled to match up with the mounting arrangements employed for the inlet throat of the resin processing machine on which thermal dryer 10 is to be used. It may also be necessary to cut off the drop tube 75 to conform to the dimensions of inlet throat 78 and feed screw 79. The bottom of tube 75 should be cut off approximately one-eighth to one-quarter inch above auger 79.

Figure 5:
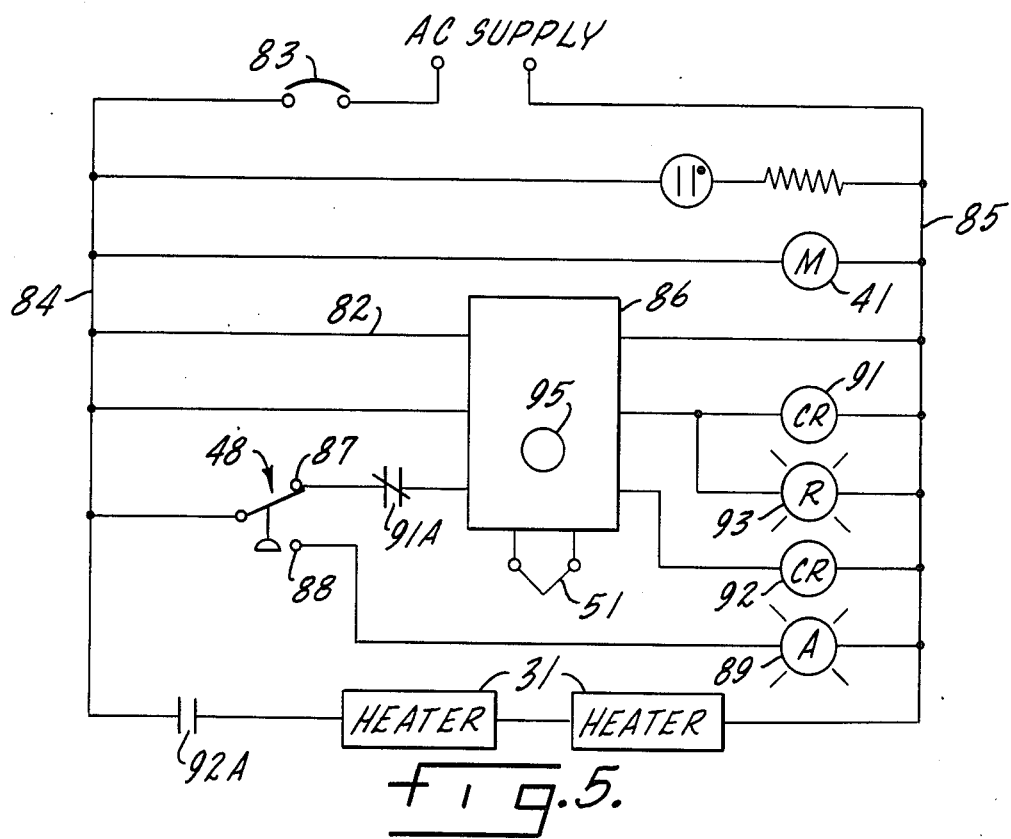
FIG. 5 is an electrical schematic of a control for the dryer of FIGS. 1-4.

FIG. 5 affords a schematic illustration of an electrical control for thermal dryer 10. That control includes a main power switch 83, which may be a circuit breaker, for two power lines 84 and 85 across which blower motor 41 is connected. A temperature controller 86 has its energizing circuit connected between power lines 84 and 85. The low pressure sensor switch 48, which has a normally open, held closed contact 87 and a normally closed, held open contact 88 is connected to power line 84. Contacts 87 and 88 are shown as in normal operation of the dryer. Contact 88 is connected to a vacuum alarm indicator, shown as an amber indicator lamp 89. Contact 87 of switch 48 is connected to a series circuit comprising a pair of normally closed relay contacts 91A, controller 86, and a relay coil 92 that is returned to power line 85.

Thermocouple 51 is connected to temperature controller 86, FIG. 5. Controller 86 also provides a part of a circuit that includes another relay coil 91; coil 91 is used to actuate the normally closed contacts 91A. A high temperature alarm indicator 93 is connected in parallel with coil 91; indicator 93 is shown as a red indicator lamp. The heaters 31 are connected across power lines 84 and 85 in series with a pair of normally open relay contacts 92A that are actuated by coil 92.

In normal operation of dryer 10 pelletized or granular resin is supplied to chamber 19 through inlet tube 22 at the top of thermal dryer 10. The resin passes downwardly through drying chamber 19 and out through the bottom of the drying chamber into funnel 73. Funnel 73 and tube 75 guide the falling resin into the intake opening 80 in throat 78 and into the feed screw 79 of the resin processing apparatus being supplied through dryer 10.

During normal operation, blower 39 is continuously energized to pull air into dryer 10 through inlet port 27, discharging the air through outlet port 29. The path of movement of air in the dryer, starting from inlet port 27, extends through filter 28 into the air treatment chamber 26 and over the outside of motor 41 and blower 39, picking up appreciable heat generated by the blower and its motor. The path of air movement continues around the outside of tubular support member 15 and into the two air entry openings 35 in heater enclosure 32. The air is heated by the electrical heaters 31 and exits from heater enclosure 32 through screened opening 36 into process air tube 37, from which it is discharged into the bottom portion of resin drying chamber 19. The temperature of the air entering drying chamber 19 is sensed by thermocouple 51. The air movement continues out of the top of chamber 19 through perforated plate 20 and into air passage 21. From passage 21 the air path continues through screened opening 45 and elbow 44 into blower inlet 43. From outlet 46 of blower 39 the air is exhausted through hose 47 and outlet port 29.

Temperature controller 86 includes a thermal adjustment member 75 (FIGS. 1 and 5) that is utilized to set the thermal controller for an appropriate drying temperature; that temperature setting may be varied to suit the particular resin being dried. This determines the temperature of the air introduced into drying chamber 19 through air process tube 37. Thermocouple 51 senses the temperature of the air being fed into the drying chamber through tube 37. Whenever the air temperature reaches the set value, relay coil 92 is de-energized, opening relay contacts 92A and deenergizing heaters 31. Whenever the air temperature is below the set point for controller 86, determined by adjustment 95, the controller keeps coil 92 energized to keep heaters 31 on and maintain the set temperature. This simple control arrangement permits relatively precise control of the temperature of drying air supplied to chamber 19.

If an abnormally high temperature occurs, above the set point temperature for controller 86, the controller energizes relay coil 91, opening contacts 91A. With contacts 91A open, coil 92 is de-energized and heaters 31 are shut off as previously described. Furthermore, lamp 93 is now lit, warning of an over-temperature condition. When the temperature drops to the set point, normal operation is resumed.

With continued operation, there is also a possibility that an abnormal condition may occur in which some portion of the air movement path may be partially or totally blocked. When this occurs, pressure switch 48 detects an excessively low pressure condition at the inlet to blower 39 (FIG. 1). In these circumstances, pressure switch 48 is actuated to close contact 88 and open contact 87 (FIG. 3). This action of switch 48 energizes the low pressure alarm indicator lamp 89 and deenergizes relay coil 92. When coil 92 is deenergized, contacts 92A open and heaters 3]are again deenergized to avoid creating an unduly high temperature in dryer 10.

When the time comes to change from one resin to another in operation of the extruder, injection molding machine, or other processing apparatus supplied through dryer 10, operation of the dryer can be interrupted by means of the ON/OFF switch or circuit breaker 83 (FIG. 5). Slide gate 58 (FIGS. 1,3) is pushed inwardly across mounting plate 55. This closes the gate. Pin 70 is removed and mounting plate 55 is pivoted to one side (arrows B), moving the entire dryer 10 (above plate 76) to a service position clear of the intake opening 80 in throat 78 of the resin processing apparatus. It is then a simple matter to again open slide gate 58 so that any resin remaining in chamber 19 can be cleared from dryer 10. Pivoting dryer 10 to a service position displaced from the process apparatus inlet throat 78 also allows access to the intake opening 80 so that the resin processing apparatus (e.g., feed screw 79) can be cleaned out and made ready for introduction of a new resin. To resume operation, of course, plate 55 is pivoted back to its original position, gate 58 is pulled out to open the gate, and pin 70 is replaced, so that the dryer is again ready to function.

In operation, thermal dryer 10 is highly efficient in its utilization of energy. The substantial heat generated by motor 41 and blower 39 is picked up by the movement of air through chamber 26 in dryer 10, since that air passes over both the motor and the blower. This heat, which is normally wasted, is utilized as a part of the heat required for the air utilized in drying chamber 19. On the other hand, insulation layer 34 on wall 33 of support tube 15 prevents excessive heating of member 15 by conductivity from heaters 31, so that the temperature within chamber 19 can be controlled by adjustment of the temperature of air introduced into that chamber through process air tube 37. Enclosure 32 around heaters 31 further avoids excessive heat loss.

In the illustrated embodiment, the lower end of air passage 21 communicates directly with the intake passage 80 of the extruder, injection molding machine, or other resin processing apparatus supplied by dryer 10. Vaporized moisture and volatile gases produced by melting of the resin in the resin processing apparatus are drawn upwardly, directly through intake opening 80, around the outside of drop tube 75, and through passage 13 in the lower end bell 11 and into air passage 21, since air passage 21 is at a pressure below atmospheric. Heat from gas exhausted from the resin processing apparatus is thus transferred to the cylinder 18 defining drying chamber 19 and is utilized in drying of the resin.

Some of the hot gases from auger 79 may also pass upwardly through tubes 75 and 72 and funnel 73 and through the resin in chamber 19. Thus, some heat from the intake 80 of the resin processing apparatus itself may be utilized in drying the resin passing through chamber 19. For the most part, however, the vaporized moisture and volatile gases bypass the incoming granular resin, allowing better thermal control in the dryer.

We claim:
1. A thermal dryer for drying granular resin comprising:
   a vertically oriented substantially imperforate cylinder defining a resin drying chamber, the bottom of the cylinder having a discharge opening for discharging resin from the drying chamber;

resin input means for introducing granular resin into the top of the cylinder to flow downwardly through the drying chamber;

a tubular member disposed in spaced encompassing relation to at least a portion of the cylinder, the cylinder and the tubular member defining an air passage communicating with the top of the drying chamber;

a housing, disposed in spaced encompassing relation to the tubular member and the cylinder, defining an enclosed air treatment chamber having an air inlet port and an air outlet port, that is isolated from the drying chamber and the air passage;

heater means, comprising a heater disposed within a heater enclosure mounted in the air treatment chamber, for heating air passing through the heater enclosure, the heater enclosure having at least one air entry opening to admit air from the air treatment chamber;

a process air tube extending from the heater enclosure into the lower portion of the drying chamber;

and air blower means mounted in the air treatment chamber and having an inlet connected to the air passage and an outlet connected to the outlet port, for establishing and maintaining a flow of air from the inlet port into the air treatment chamber, around the blower means, into and through the heater means and the process air tube, upwardly through the resin in the drying chamber and into the air passage, through the blower means, and out through the outlet port.

2. A thermal dryer according to claim 1 in which the heater comprises at least one electrical heater and in which the heater is controlled by a heat sensor positioned within the process air tube to sense the temperature of the air as the air enters the drying chamber.

3. A thermal dryer according to claim 1 in which the tubular member extends for substantially the full height of the cylinder, and the bottom of the tubular member is connected to a resin processing apparatus so that the blower means also draws gases from the processing apparatus into the air passage and exhausts such gases through the outlet port.

4. A thermal dryer according to claim 1 in which the tubular member is of rectangular configuration and extends for substantially the full height of the cylinder, the heater enclosure is mounted on one wall of the tubular member, and the blower means is mounted on another wall of the tubular member.

5. A thermal dryer according to claim 4 in which the heater comprises at least one electrical heater and in which the heater is controlled by a heat sensor positioned within the process air tube to sense the temperature of the air as the air enters the drying chamber.

6. A thermal dryer according to claim 5 and further comprising:

a pressure sensor for sensing air pressure at the inlet to the air blower means;

and means for de-energizing the heater means in response to sensing of a predetermined low pressure condition by the pressure sensor.

7. A thermal dryer according to claim 5 in which the one wall of the tubular member is insulated to limit heat transfer between the heater means and the air passage.

8. A thermal dryer according to claim 5 in which the bottom of the tubular member is connected to a resin processing apparatus so that the blower means also draws gases from the processing apparatus into the air passage and exhausts such gases through the outlet port.

9. A thermal dryer according to claim 8 and further comprising mounting means for mounting the thermal dryer on the resin processing apparatus for movement between a normal position in which the discharge opening of the drying chamber is in direct communication with a resin intake in the resin processing apparatus and a service position in which the thermal dryer is displaced from the resin intake, allowing service access to the dryer and the resin intake.

10. A thermal dryer according to claim 9 and further comprising a gate for closing off the discharge opening of the drying chamber.

11. A thermal dryer for drying granular resin comprising:

a vertically oriented cylinder defining a resin drying chamber, the bottom of the cylinder having a discharge opening for discharging resin from the drying chamber;

resin input means for introducing granular resin into the top of the cylinder to flow downwardly through the drying chamber;

a tubular member disposed in spaced encompassing relation to at least a portion of the cylinder, the cylinder and the tubular member defining an air passage communicating with the drying chamber;

a housing, disposed in spaced encompassing relation to the tubular member and the cylinder, defining an enclosed air treatment chamber having an air inlet port and an air outlet port, that is isolated from the drying chamber and the air passage;

heater means, comprising a heater disposed within a heater enclosure mounted in the air treatment chamber, for heating air passing through the heater enclosure, the heater enclosure having at least one air entry opening to admit air from into the air treatment chamber;

a process air tube extending from the heater enclosure into the lower portion of the drying chamber;

air blower means mounted in the air treatment chamber and having an inlet connected to the air passage and an outlet connected to the outlet port, for establishing and maintaining a flow of air from the inlet port into the air treatment chamber, around the blower means, into and through the heater means and the process air tube, upwardly through the resin in the drying chamber and into the air passage, through the blower means, and out through the outlet port;

a pressure sensor for sensing air pressure at the inlet to the air blower means;

and means for de-energizing the heater means in response to sensing of a predetermined low pressure condition by the pressure sensor.

12. A thermal dryer according to claim 11 in which the heater comprises at least one electrical heater and in which the heater is controlled by a heat sensor positioned within the process air tube to sense the temperature of the air as the air enters the drying chamber.

13. A thermal dryer according to claim 11 in which the tubular member is of rectangular configuration and extends for substantially the full height of the cylinder, the heater enclosure is mounted on one wall of the tubular member and the blower means is mounted on another wall of the tubular member, and in which the one wall of the tubular member is insulated to limit heat transfer between the heater means and the air passage.

14. A thermal dryer for drying granular resin comprising:
- a vertically oriented cylinder defining a resin drying chamber, the bottom of the cylinder having a discharge opening for discharging resin from the drying chamber;
- resin input means for introducing granular resin into the top of the cylinder to flow downwardly through the drying chamber;
- a tubular member disposed in spaced encompassing relation to at least a portion of the cylinder, the cylinder and the tubular member defining an air passage communicating with the drying chamber;
- a housing, disposed in spaced encompassing relation to the tubular member and the cylinder, defining an enclosed air treatment chamber having air inlet port and an air outlet port, that is isolated from the drying chamber and the air passage;
- heater means, comprising a heater disposed within a heater enclosure mounted in the air treatment chamber, for heating air passing through the heater enclosure, the heater enclosure having at least one air entry opening to admit air from into the air treatment chamber;
- a process air tube extending from the heater enclosure into the lower portion of the drying chamber;
- air blower means mounted in the air treatment chamber and having an inlet connected to the air passage and an outlet connected to the outlet port, for establishing and maintaining a flow of air from the inlet port into the air treatment chamber, around the blower means, into and through the heater means and the process air tube, upwardly through the resin in the drying chamber and into the air passage, through the blower means, and out through the outlet port;
- mounting means for mounting the thermal dryer on a resin processing apparatus for movement between a normal position, in which the discharge opening of the drying chamber is in direct communication with a resin intake in the resin processing apparatus and the bottom of the tubular member is connected to the resin processing apparatus so that the blower means also draws gases from the processing apparatus into the air passage and exhausts such gases through the outlet port, and a service position in which the thermal dryer is displaced from the resin intake, allowing service access to the dryer and the resin intake.

15. A thermal dryer according to claim 14 in which the mounting means comprises a fixed mounting plate affixed to the resin processing apparatus, a pivotal mounting plate pivotally mounted on the fixed mounted plate, and retainer means for releasably maintaining the two mounting plates in a normal, aligned operating position.

16. A thermal dryer according to claim 15 in which the two mounting plates have apertures therethrough which, with the mounting plates aligned, afford separate extensions of the drying chamber into the resin intake, so that the blower means draws gases from the processing apparatus directly into the air passage to be exhausted through the outlet port.

17. A thermal dryer according to claim 16, and further comprising a slide gate, mounted in the pivotal mounting plate, for closing off the discharge opening of the drying chamber.

18. A thermal dryer according to claim 17 in which the heater comprises at least one electrical heater and in which the heater is controlled by a heat sensor positioned within the process air tube to sense the temperature of the air as the air enters the drying chamber.

19. A thermal dryer according to claim 18 and further comprising:
- a pressure sensor for sensing air pressure at the inlet to the air blower means;
- and means for de-energizing the heater means in response to sensing of a predetermined low pressure condition by the pressure sensor.

* * * * *